United States Patent
Suzuki et al.

(10) Patent No.: US 6,375,336 B1
(45) Date of Patent: Apr. 23, 2002

(54) SPREAD ILLUMINATION APPARATUS

(75) Inventors: Shingo Suzuki; Masafumi Okada; Koichi Toyoda, all of Asaba-cho (JP)

(73) Assignee: Minebea Co., Ltd., Miyota (JP)

( * ) Notice: Subject to any disclaimer, the term of this patent is extended or adjusted under 35 U.S.C. 154(b) by 0 days.

(21) Appl. No.: 09/450,779

(22) Filed: Nov. 30, 1999

(30) Foreign Application Priority Data

Feb. 16, 1999 (JP) ............................................ 11-037226

(51) Int. Cl.[7] ................................................. F21V 7/04
(52) U.S. Cl. ............................ 362/31; 362/26; 382/146; 349/65
(58) Field of Search ...................... 362/31, 26; 385/146; 349/65

(56) References Cited

U.S. PATENT DOCUMENTS 5,718,497 A * 2/1998 Yokoyama et al. ............ 362/26
5,779,338 A * 7/1998 Ishikawa et al. ............... 362/31
6,164,790 A * 12/2000 Lee .............................. 362/31

FOREIGN PATENT DOCUMENTS

JP          A-11-242222          9/1999

* cited by examiner

Primary Examiner—Stephen Husar
Assistant Examiner—Guiyoung Lee
(74) Attorney, Agent, or Firm—Oliff & Berridge PLC

(57) ABSTRACT

The invention describes a light reflection pattern to spread the volume of the emitted light from a bar-like light source with a plurality of grooves provided along a transparent substrate and plane portions adjacent to the grooves. By setting the inclined angle of the grooves along the transparent substrate the light is introduced with a high efficiency to a liquid crystal display device in the direction perpendicular to the substrate. By restricting the ratio of the width of the grooves to the pitch that is the occupied area in the range of 0.01–0.15 (preferably 0.01–0.1) the ratio becomes one in which the duplicate image component is not recognized by the naked eyes while image brightness is maintained.

4 Claims, 3 Drawing Sheets

X(mm): distance from standard location

X(mm): distance from standard location

SPREAD ILLUMINATION APPARATUS

BACKGROUND OF THE INVENTION

1. Field of the invention

The present invention relates to a spread illumination apparatus for use of illuminating a signboard and various kind of reflection type of display, in particular, a liquid crystal display apparatus.

2. Related arts

As an auxiliary illuminating apparatus for illuminating the screen of a liquid crystal display apparatus an outlined constitution of a spread illumination apparatus (Japanese Patent Application No.Hei 10-345270) proposed by the inventors of the present invention is explained hereinafter while showing it in FIGS. 4 and 5. Further this spread illumination apparatus 1' is indicated as a prior art. The spread illumination apparatus 1' is used and disposed for covering the screen (front) F of a liquid crystal display element L, and comprises a transparent substrate 2 plane and sectionally rectangular made of a material having a high light permeability and a light source lamp 4 disposed at the one side end 3 of the transparent substrate 2. As the light source lamp 4, a bar-like one such as a cold cathode fluorescent lamp (CCFL) or a hot cathode fluorescent lamp (HCFL) is used. For reference, the transparent substrate 2 may happen to be wedge-like in configuration in order to become light-weighted.

Here, in FIG. 5, the surface of the transparent substrate 2 to be touched to the reflection type of liquid crystal display element L is to be called a lower surface 5 and its reverse surface is to be called an upper surface 6 (front surface) as an observation surface.

In FIG. 4, on the upper surface 6 of the transparent substrate 2, a light reflection pattern 7 is formed. The light reflection pattern 7 is formed along the one side end face 3 and formed of a plurality of grooves 8 approximately triangular and plane portions 9 adjacent to the grooves 8. The light reflection pattern 7 is adapted to be formed, regardless the distance from the light source lamp 4, in such a manner as, in order to realize an even and spread emission of the light from the transparent substrate 2, a spacing of the grooves to be formed is made different depending on the location of the groove. That is, the ratio of the area occupied by the groove to the area occupied by the plane portion is set in such a manner as it is increased gradually great as the grooves depart far from the one side end face 3 of the transparent substrate 2 where the light source lamp 4 is disposed nearby. Concretely, the width and depth of the groove or the spacing of the grooves to be provided may be varied.

And, on the sides of the light source lamp 4 and the transparent substrate 2 a reflection member 10 to reflect the light to the screen side is provided.

When disposing thus formed spread illumination apparatus 1' so as to cover the upper surface of the reflection type of liquid crystal display element L, the emitted light from the light source lamp 4 enters the transparent substrate 2 from the one side end face 3 and progresses toward an opposite side 11 within it while repeating reflection and refraction. During which, since the light emitted from the lower surface 5 of the transparent substrate 2 illuminates the reflection type of liquid crystal display element L, the screen of the liquid crystal element can be illuminated bright.

At that time, since the light reflection pattern 7 is provided, the volume of the light emitted from the lower surface 5 is approximately even regardless the distance from the light source lamp 4, the reflection type of liquid crystal display element L can be illuminated in a spread manner.

On the other hand, since a spread illumination apparatus 1' is formed with the light reflection pattern 7 consisting of the grooves 8 and plane portions 9 on the transparent substrate 2, there are following problems.

When producing actually the spread illumination apparatus 1' having the above constitutions, disposing it in such a manner as it covers the observation face F of the liquid crystal display element L and observing the screen, it has been found that, nearby on the opposite surface 11, an image on the screen is observed in duplicate (hereinafter referred to as "duplicate image"), which causes the quality of the picture to be degenerated outstandingly. For reference, since the grooves 8 of the light reflection pattern 7 formed on the transparent substrate 2 are quite fine, when observing the picture, these grooves can not be recognized by naked eyes.

The cause of generation of this duplicate image has been found to be caused by the grooves 8 of the light reflection pattern 7 of the transparent substrate 2. That is, as shown in FIG. 5, a picture of a picture element component Q comprises, in a fine level, a real picture passing through the plane portion shown in an arrow A and a phantom picture reflected by the grooves 8 shown in an arrow B (hereinafter referred to as "duplicate image component"). Further, in the picture of picture element component Q' comprises a real picture passing through the plane portion 9 shown in an arrow A' and a duplicate image component shown in an arrow B'. Accordingly, as shown in an area R, a duplicate image is generated due to overlapping of the real image (arrow A') and a duplicate image component (arrow B). If the ratio of this duplicate image component is small, there is no problem because it is not recognized by naked eyes, if it is great, a duplicate image is observed. Since this duplicate image component is increased in proportion to the size of the occupied area (the width and the depth of the grooves 8), in other word, due to the pattern design of the light reflection pattern 7 formed on the transparent substrate 2 the duplicate image is observed more as close to the end portion 11 of the transparent substrate 2 (FIG. 4).

On the other hand, the light reflection pattern 7 is increased in brightness due to the increased volume of the light emitted from the upper surface 6 when the area occupied by the grooves 8 is increased.

As mentioned above, for avoiding the generation of duplicate image, it is preferable to reduce the occupied area of the grooves 8, on the other hand, for the purpose of increasing the brightness it is preferable to increase the occupied area of the grooves 8, therefore, so as to satisfy these contradictory conditions, the pattern of the light reflection pattern 7 has to be designed.

Accordingly, the purpose of the present invention is to provide a spread illumination apparatus to restrain the generation of the duplicate image while maintaining the brightness by restricting the occupied area of the grooves.

SUMMARY OF THE INVENTION

As a means to solve the above problems, according to a first aspect of the present invention, in a spread illumination apparatus of a side-light system, in which, nearby the side of the transparent substrate made of a material having a high light permeability, a bar-like (linear) light source is provided and a light reflection pattern is formed on the transparent substrate so as to equalize the volume of the emitted light spread on the screen, said light reflection pattern comprises a plurality of grooves formed along the bar-like light source and plane portions adjacent to such grooves, where the grooves are set slantwise at an angle in such a manner as the light to progress toward the grooves is emitted perpendicularly to the rear surface of the transparent substrate and, provided that a length from a groove to an adjacent groove is set as a pitch, the ratio of the width of the groove to the pitch is to be 0.01–0.15.

According to a second aspect of the present invention, said ratio is 0.01–0.1.

According to a third aspect of the present invention, said ratio of the width of the groove to the pitch is gradually increased from the side at which the bar-like light source is disposed to the opposite side thereof.

By structuring as mentioned above, in the spread illumination apparatus of the present invention, since the light reflection pattern formed with a plurality of grooves and plane portions adjacent to the grooves and the light to progress toward the grooves is emitted from the rear surface of the transparent substrate in such a manner as the angle of the groove is inclined so as to make the direction of the light to be emitted perpendicular to the rear surface, so that the light is introduced in a high efficiency, and that, by setting the ratio of the width of the groove to the pitch is set to the range of 0.01–0.15 (preferably 0.01–0.1), so that due to this restriction of the width and the depth of the groove, making the duplicate image to a duplicate image component to an extent where it is not recognized by naked eyes.

EMBODIMENT

Figure 4:
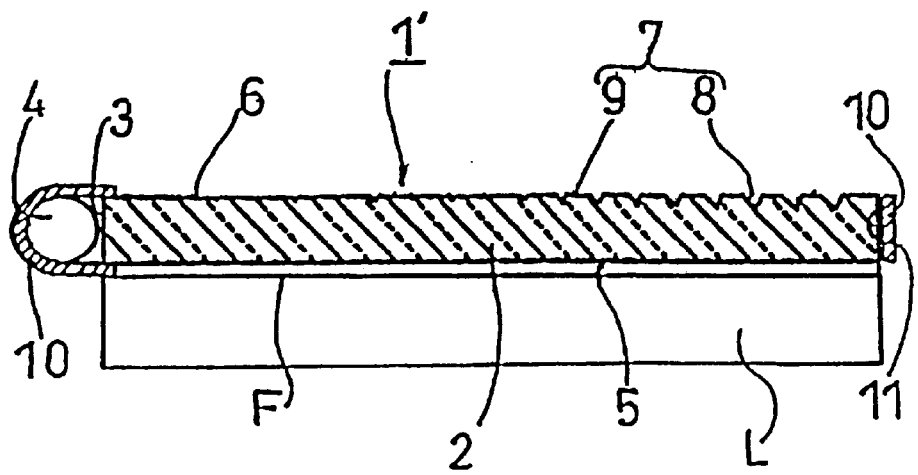
FIG. 4 is a sectional view of a conventional spread illumination apparatus.
Figure 5:
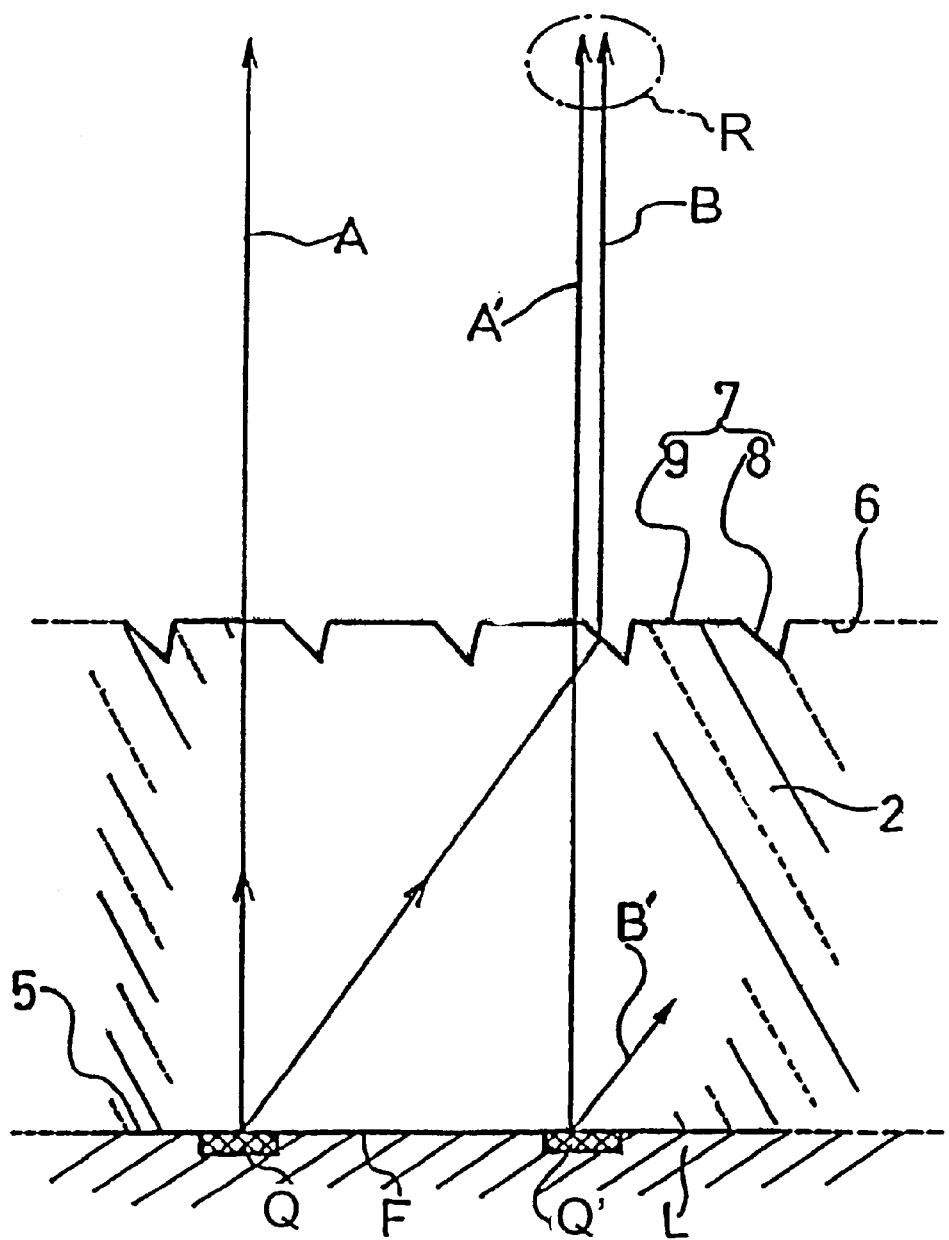
FIG. 5 is an explanatory drawing for explaining a principle for generating a duplicate image.

Hereinafter, a spread illumination apparatus 1 as an embodiment of the present invention is explained referring to the attached drawings. For reference, an outlined constitution of the spread illumination apparatus 1 is identical with the one of the spread illumination apparatus 1' which has been explained as a prior art based on FIG. 4, accordingly here merely different portions are explained as follows.

Figure 1:
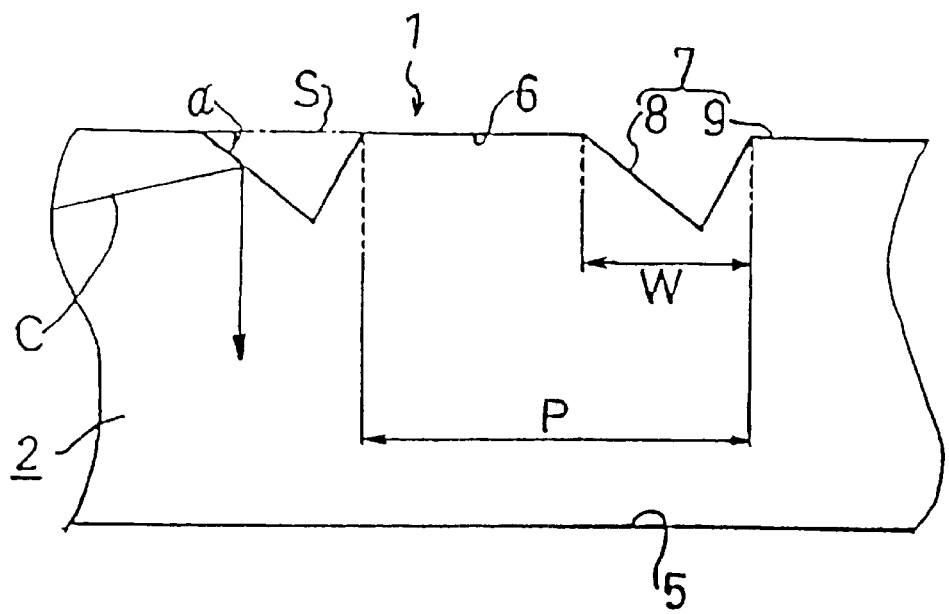
FIG. 1 is an explanatory drawing for explaining a light reflection pattern as a main portion of the spread illumination apparatus of the present invention.

As shown in FIG. 1, the light reflection pattern 7 applied to the transparent substrate 2 is formed in such a manner as the length from one groove 8 to an adjacent plane portion 9 will give a pitch P and the width of the groove 8 will give a width W. At that time, when observing the picture while changing gradually W/P, the ratio of the width of the groove 8 to the pitch P, if the ratio thereof W/P is set to less than 0.15, the duplicate image has been found to be not recognized by naked eyes. Further, considering the quality of the picture, it is more preferable if the ratio is less than 0.1. Further, although the ratio of the width of the groove 8 to the pitch P is preferable if it is closest to zero, it may be better by more than 0.01, that is, W/P is set within the range of 0.01–0.15.

Further, the ratio W/P may be changed to increase simply closer to the opposite surface 11 within the range of 0.01–0.15. Thus, if the ratio W/P is changed, since at the area closer to the end portion 11, the ratio of the occupied area of the groove 8 can be set large, at the area far from the light source lamp 4 the brightness is secured.

In addition, the groove 8 is configured approximately triangular, and of the bottom angles shown in phantom line S, if the inclined angle closer to the light source lamp 4 (see FIG. 4) gives an α, the inclined angle α shown in FIG. 1 is set in such a manner as the light C progressing to the groove 8 is emitted from the rear surface 5 of the transparent substrate 2 to the direction perpendicular to the rear surface 5. Thereby, the reflection type of liquid crystal display element L (see FIG. 4) located below the transparent substrate 2 can be illuminated with a high efficiency.

The concrete structure is explained in more details for observing the picture of the liquid crystal display element L with the spread illumination apparatus 1. As the transparent substrate 2, it is made from a plane plate of acrylic resin (80 mm×60 mm, 1 mm in thickness) and at one side of the longitudinal sides (one side end face 3) a light source lamp 4 is disposed. As the light source lamp 4, a cold cathode φ2.3 mm is used.

Figure 2:
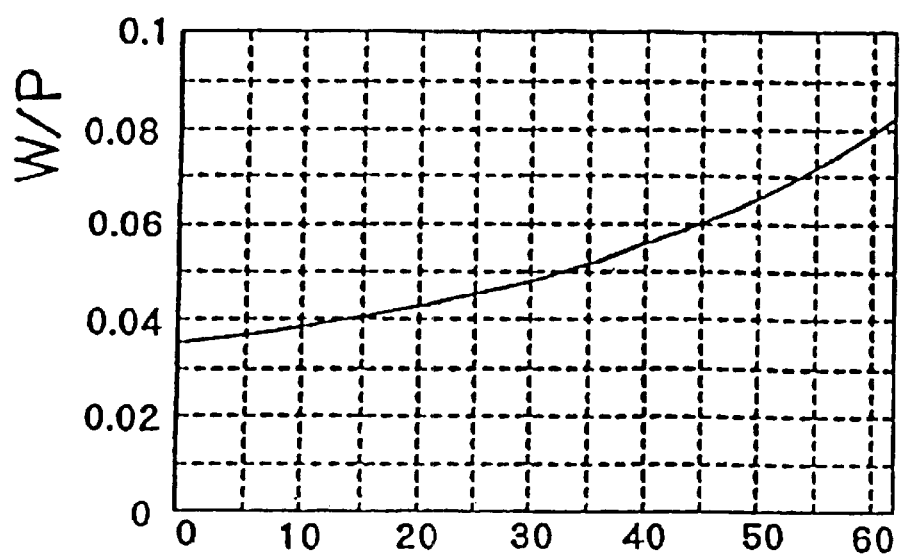
FIGS. 2 and 3 are graphs showing variations of the width to pitch ratio w/p and distances from a standard location.

The light reflection pattern 7 is formed of the grooves 8 and the plane portions 9, the pitch is 0.32 mm constant, as shown in FIG. 2, the ratio W/P is 0.035–0.08, and it is set in such a manner as it becomes gradually greater as departing from the standard location X (=0). This standard location X (=0) is on the one side end face 3 to which the light source lamp 4 abuts on the upper surface 6 of the transparent substrate 2, the standard location X is displaced perpendicular to the one side end face 3 at the position in X=60, it is located on the opposite end face 11. And, as shown in FIG. 1, the sectional view of the groove is made to be triangular, the inclined angle α is set at an angle of 45 degrees and a valley portion (corresponding to an apex angle of a triangle which has the bottom side depicted in a phantom line S) is set at an angle of 60 degrees.

Figure 3:
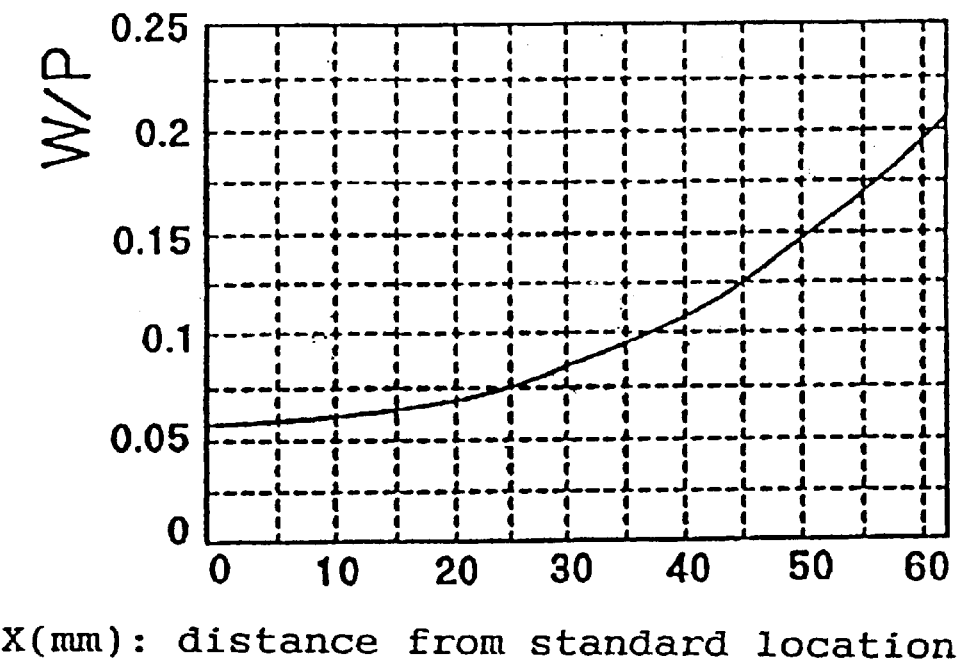

As a comparative example, in the structure of the illumination apparatus same as in the above example, observed the picture of the liquid crystal display element L with the spread illumination apparatus 1, letting the ratio W/P of the light reflection pattern 7 to be 0.055–0.2, while setting it as gradually great as departs far from the standard location (X=0). The result is shown in FIG. 3.

When observing the picture of the reflection type of liquid crystal display element L disposed with the spread illumination apparatus 1 of the above embodiment and the comparative example by naked eyes, in the spread illumination apparatus 1 as the embodiment, no duplicate image can be observed, on the contrary, in the spread illumination apparatus 1 of the comparative example, a duplicate image can be observed within the range of the standard location X=50 and=60 in which the ratio W/P becomes more than 0.15.

As mentioned above in detail, the spread illumination apparatus 1 according to the first aspect of the present invention, since the light reflection pattern equalizing the volume of the emitted light spread on the screen is formed with a plurality of grooves provided along the bar-like light source and plane portions adjacent to the grooves, and by setting an angle of inclination of the grooves to emit the light running through the grooves in the perpendicular direction to the back of the transparent substrate, the light is guided in a high efficiency, and by setting the ratio of the width of the groove to the pitch in the range of 0.01–0.15 to the extent, where the duplicate image component becomes the ratio under which the naked eyes can not recognize it, and the occupied area in the grooves can be limited, while maintaining the brightness, the generation of the duplicate image can be restrained. Further, the lower limit of the ratio of the width of the groove to the pitch is made clear in consideration of the working precision of the light reflection pattern to be applied to the transparent substrate According to the second aspect of the present invention, the ratio of the width of the groove to the pitch is further restricted to 0.01–0.1 to guarantee the quality of the picture.

According to the third aspect of the present invention, since the ratio of the width of the groove to the pitch is set in such a manner as it is increased gradually as closer to the side opposite to the side at which the light source lamp is disposed, so that, even at the location far from the light source lamp, the given brightness is secured.

What is claimed is:

1. A front light type spread illumination apparatus of a side-light system, in which, nearby a first side of a transparent substrate made of a material having a light permeability, a bar-like (linear) light source is provided and a light reflection pattern is formed on the transparent substrate so as to equalize a volume of emitted light spread on a screen, the light reflection pattern comprises a plurality of grooves formed along the bar-like light source and plane portions adjacent to such grooves, where the grooves are set at an angle of inclination to emit the light running through the grooves in a direction perpendicular to the back of the transparent substrate and, a length from a groove to an adjacent groove is set as a pitch, and a ratio of a width of a groove to the pitch is to be 0.01–0.15.

2. A spread illumination apparatus according to claim 1, wherein the ratio is 0.01–0.1.

3. A spread illumination apparatus according to claim 1, wherein the ratio of the width of the groove to the pitch is gradually increased from the first side at which the bar-like light source is disposed to the opposite side thereof.

4. A spread illumination apparatus according to claim 2, the ratio of the width of the groove to the pitch is gradually increased from the first side at which the bar-like light source is disposed to the opposite side thereof.

* * * * *